US008651727B2

(12) United States Patent
Yang

(10) Patent No.: US 8,651,727 B2
(45) Date of Patent: Feb. 18, 2014

(54) DISPLAY APPARATUS AND BACKLIGHT MODULE AND HOLDER STRUCTURE THEREOF

(75) Inventor: Ruilian Yang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 347 days.

(21) Appl. No.: 12/991,439

(22) PCT Filed: Sep. 30, 2010

(86) PCT No.: PCT/CN2010/077549
§ 371 (c)(1),
(2), (4) Date: Nov. 7, 2010

(87) PCT Pub. No.: WO2012/006819
PCT Pub. Date: Jan. 19, 2012

(65) Prior Publication Data
US 2012/0120634 A1 May 17, 2012

(30) Foreign Application Priority Data
Jul. 12, 2010 (CN) .......................... 2010 1 0225794

(51) Int. Cl.
*G02B 6/10* (2006.01)
(52) U.S. Cl.
USPC ......................................... 362/633; 362/97.4
(58) Field of Classification Search
USPC .............. 362/97.4, 633, 634, 217.14, 217.15, 362/217.11
See application file for complete search history.

(56) References Cited

U.S. PATENT DOCUMENTS

| 6,667,780 | B2* | 12/2003 | Cho ................................ 349/58 |
| 7,188,965 | B2* | 3/2007 | Chang et al. ................. 362/97.4 |
| 7,226,201 | B1 | 6/2007 | Li et al. |
| 7,543,975 | B2* | 6/2009 | Yuan et al. .................... 362/632 |
| 7,665,878 | B2* | 2/2010 | Hsieh ............................ 362/633 |
| 7,744,234 | B2* | 6/2010 | Jeong et al. .................. 362/97.4 |
| 7,954,968 | B2* | 6/2011 | Takata et al. ................. 362/97.1 |
| 7,973,873 | B2* | 7/2011 | Ha et al. .......................... 349/58 |
| 2007/0147022 | A1* | 6/2007 | Lee et al. ........................ 362/97 |
| 2008/0043168 | A1 | 2/2008 | Hsiao |

FOREIGN PATENT DOCUMENTS

| CN | 101231420 A | 7/2008 |
| CN | 101414074 A | 4/2009 |
| JP | 2006-338020 A | 12/2006 |

* cited by examiner

Primary Examiner — Jong-Suk (James) Lee
Assistant Examiner — Leah S Macchiarolo
(74) Attorney, Agent, or Firm — Cheng-Ju Chiang

(57) ABSTRACT

The present invention provides a display apparatus, a backlight module and a holder structure thereof. The display apparatus comprises the backlight module and a display panel. The backlight module comprises a back bezel, at least one light source and two holders. The at least one light source light source is disposed on the back bezel. The holders are disposed at the two opposite sides of the backlight module. Each of the holders comprises two extension holding portions and a panel supporting surface. The extension holding portions are formed at two ends of each of the holders. The panel supporting surface is formed on the holders and the extension holding portions. The present invention can reduce the number of the components and the weight thereof.

5 Claims, 6 Drawing Sheets

DISPLAY APPARATUS AND BACKLIGHT MODULE AND HOLDER STRUCTURE THEREOF

FIELD OF THE INVENTION

The present invention relates to a display apparatus, a backlight module and a holder structure thereof, and more particularly to a display apparatus, a backlight module and a holder structure thereof for reducing the number of the components and the weight thereof.

BACKGROUND OF THE INVENTION

Liquid crystal displays (LCDs) have been widely applied in electrical products. Currently, most of LCDs are backlight type LCDs which comprise a liquid crystal panel and a backlight module. According to the position of the backlight source, the backlight module can be an edge-lighting type or a bottom-lighting type in order to provide LCDs with backlight.

Referring now to FIG. 1, a structural exploded view of a traditional liquid crystal display is illustrated. As shown in FIG. 1, the liquid crystal display 900 comprises a front frame 902, a liquid crystal display panel 904, a housing 906, optical films 908 and a backlight module 910. The housing 906 can be fastened on the optical films 908 for carrying the liquid crystal display panel 904. The front frame 902 can hold the liquid crystal display panel 904 on the backlight module 910, thereby forming the liquid crystal display 900.

However, since the number of the elements (or components) of the liquid crystal display 900 is too many, and the elements thereof have to be positioned to each other, the difficulty and time of assembling the liquid crystal display 900 are raised, and the assembling error thereof is easy generated, thereby affecting the product yield thereof.

As a result, it is necessary to provide a backlight module, a holder structure thereof and a display apparatus using the same to solve the problems existing in the conventional technologies, as described above.

SUMMARY OF THE INVENTION

A primary object of the present invention is to provide a holder structure of a backlight module oppositely disposed at a first side and a second side thereof, wherein the holder structure comprises:

two extension holding portions formed at two ends of each of the holders and partially and oppositely extending from the holders to a third side and a fourth side of the backlight module; and a panel supporting surface formed on the holders and the extension holding portions for supporting a display panel.

Another object of the present invention is to provide a backlight module, wherein the backlight module comprises:
 a back bezel;
 at least one light source disposed on the back bezel; and
 two holders disposed oppositely at a first side and a second side of the backlight module and assembled at two opposite sides of the back bezel, wherein each of the holders comprises:
  two extension holding portions formed at two ends of the holders and partially and oppositely extending from the holders to a third side and a fourth side of the backlight module; and
  a panel supporting surface formed on the holders and the extension holding portions for supporting a display panel.

Still another object of the present invention is to provide a display apparatus, wherein the display apparatus comprises:
 a backlight module comprising:
  a back bezel;
  at least one light source disposed on the back bezel; and
  two holders disposed oppositely at a first side and a second side of the backlight module and assembled at two opposite sides of the back bezel, wherein each of the holders comprises:
   two extension holding portions formed at two ends of each of the holders and partially and oppositely extending from the holders to a third side and a fourth side of the backlight module; and
   a panel supporting surface formed on the holders and the extension holding portions; and
 a display panel supported on the panel supporting surface of the holders.

In one embodiment of the present invention, the extension holding portions are formed on the holders as one piece.

In one embodiment of the present invention, the extension holding portions are assembled with the edges of the back bezel.

In one embodiment of the present invention, the back bezel includes at least one convex portion, and the convex portion is positioned between the opposite extension holding portions of the two holders, and the at least one convex portion has at least one flat surface, and the height of the flat surface is the same as the height of the panel supporting surface.

The holder structure of the present invention can form the panel supporting surfaces at four sides of the backlight module for reducing the deformation of the display panel and the number of the components thereof. Therefore, the weight of the display apparatus can be reduced, and the assembling time and the position error can also be reduced. Furthermore, since the present invention can only use two holders to hold the components of the backlight module and to contact with four sides of the display panel for supporting and positioning it, the present invention can use less components and material to assemble the display apparatus and to enhance the assembling reliability thereof, and thus has the effect of reducing cost and improving the assembling reliability thereof. Besides, since the holders of the backlight module have few components and assembly steps are relatively easy, the assembling time and the position error of the display apparatus can be significantly reduced.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
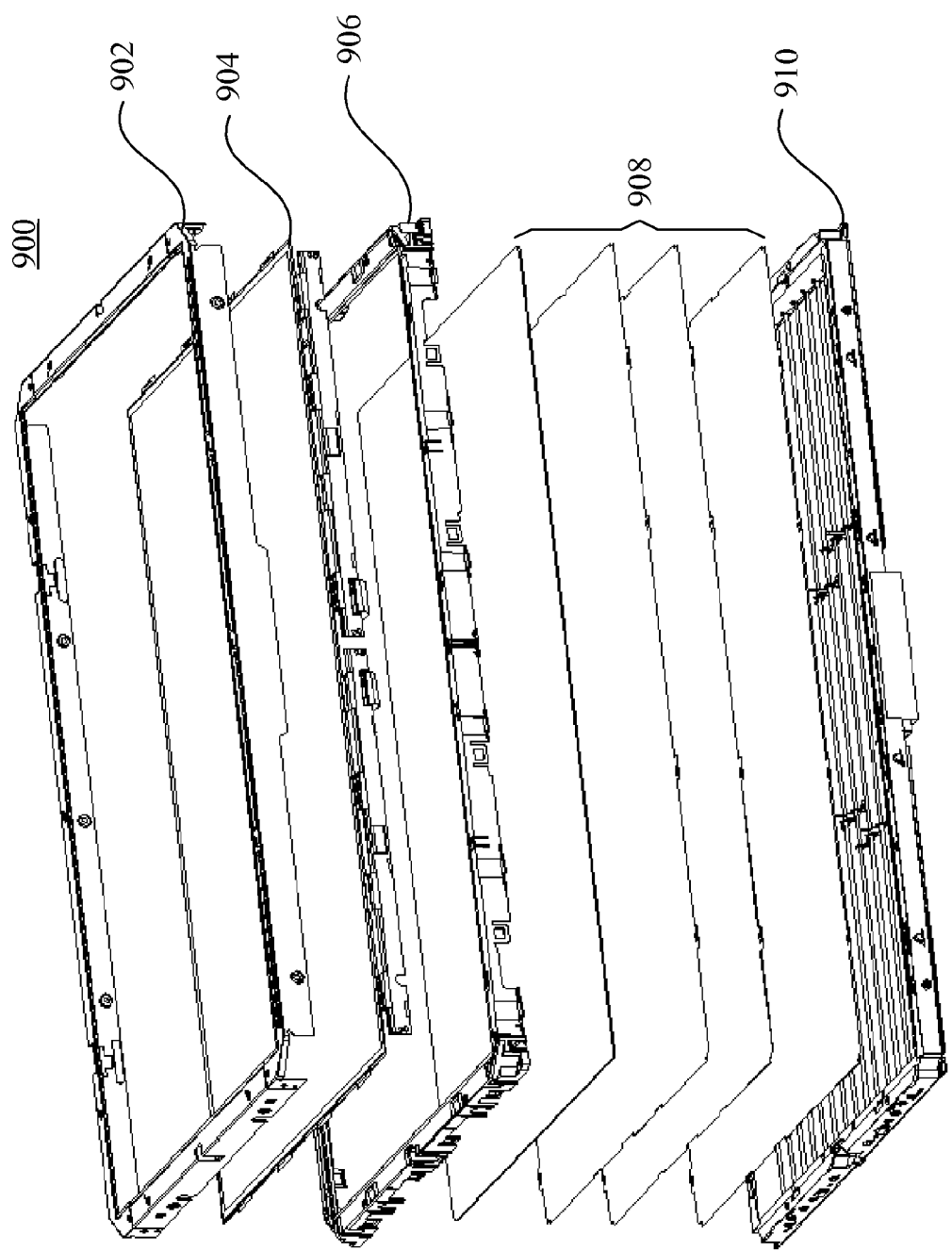
FIG. 1 is a structural exploded view of a traditional liquid crystal display.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2:
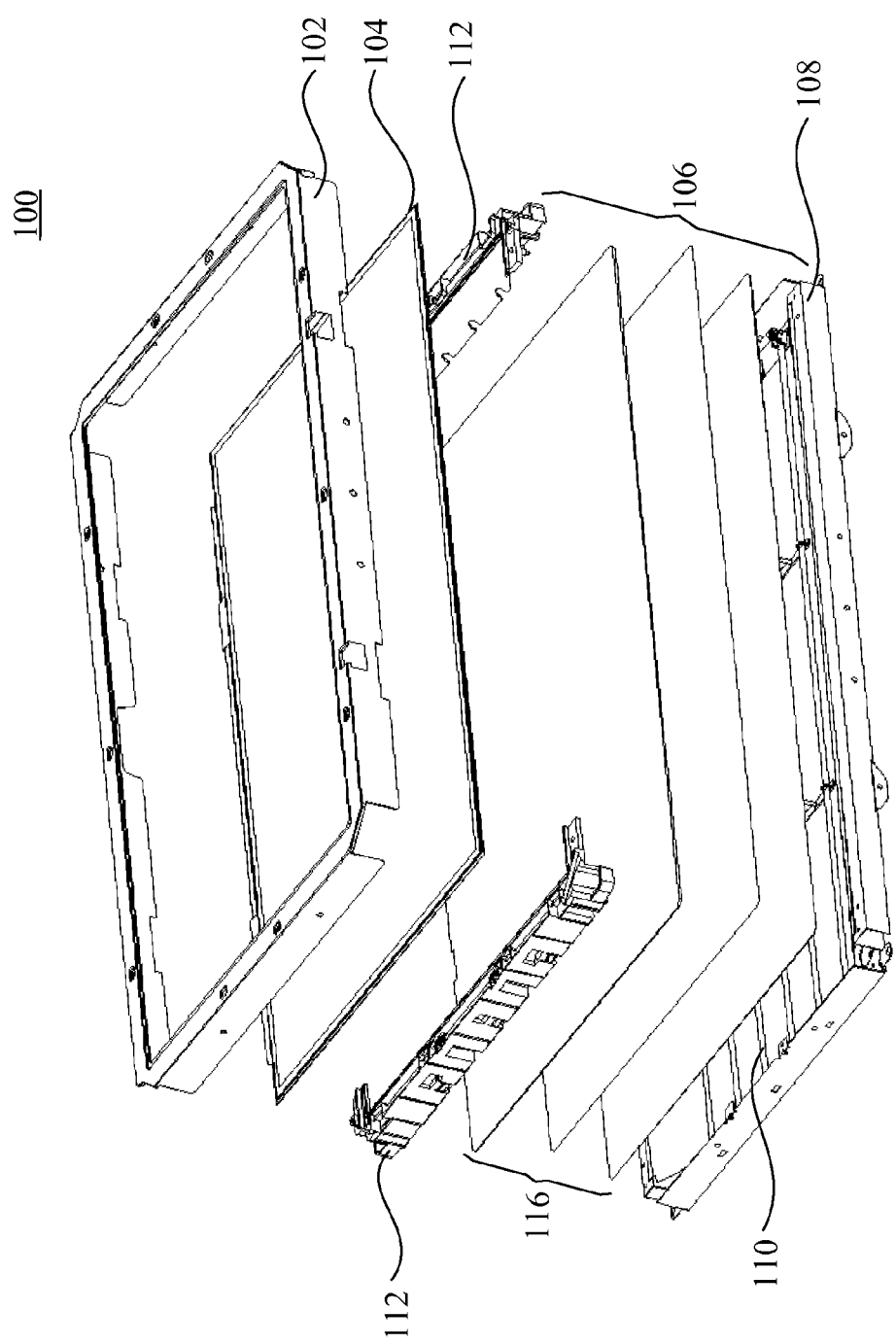
FIG. 2 is an exploded perspective view showing a display apparatus according to a first embodiment of the present invention.

Referring to FIG. 2, an exploded perspective view showing a display apparatus according to a first embodiment of the present invention is illustrated. The display apparatus 100 of the present embodiment may comprise a front frame 102, a display panel 104 (such as a liquid crystal display panel) and a backlight module 106. The front frame 102 can assemble the display panel 104 with the backlight module 106 to form the display apparatus 100. The backlight module 106 can be an edge-lighting type or a bottom-lighting type disposed opposite to the display panel 104 for providing it with backlight.

Figure 3:
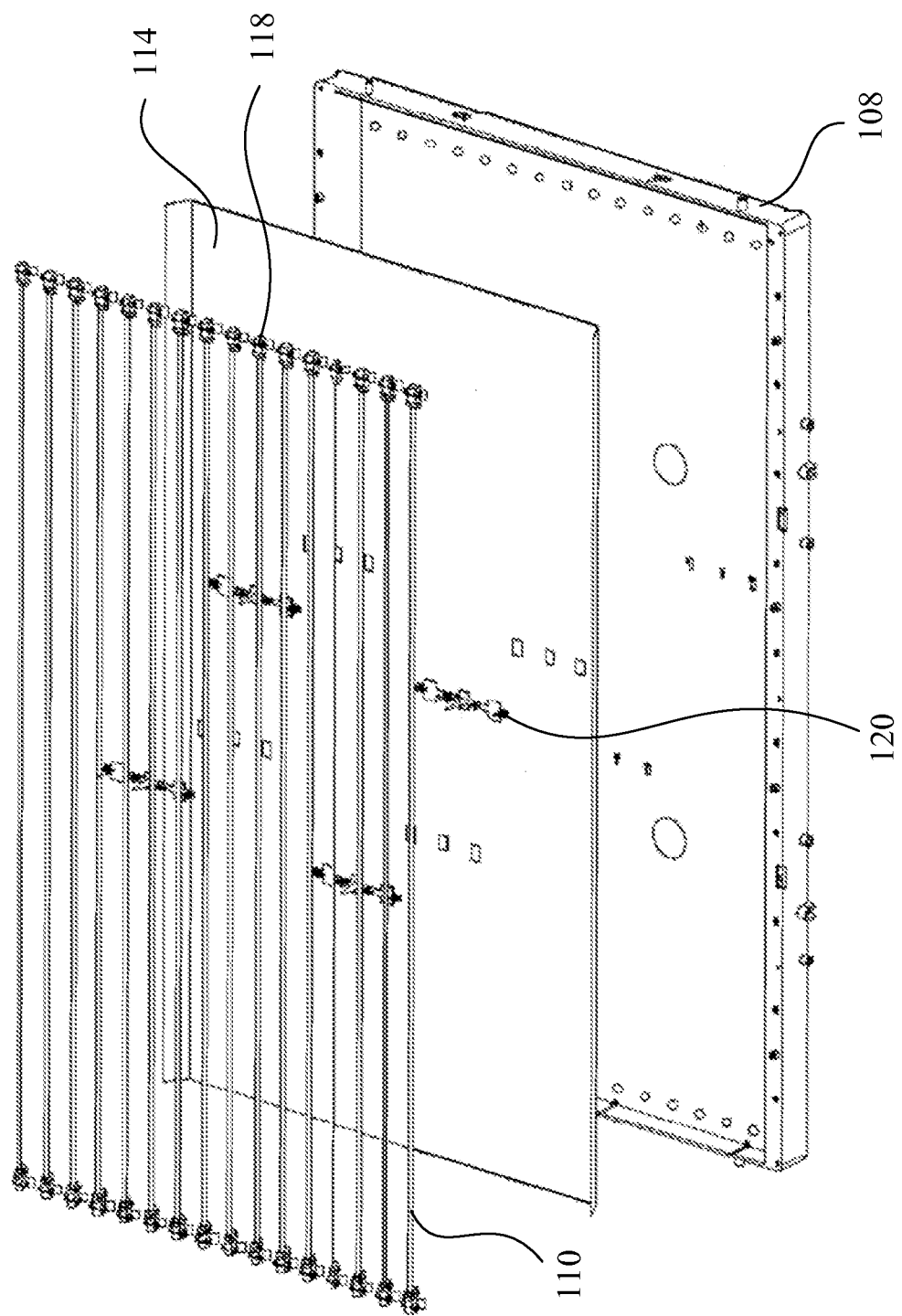
FIG. 3 is an exploded perspective view showing a backlight module according to a first embodiment of the present invention.

Referring to FIG. 2 and FIG. 3, FIG. 3 is an exploded perspective view showing a backlight module according to a first embodiment of the present invention. The backlight module 106 of the present embodiment may include a back bezel 108, at lease one light source 110, two holders 112, a reflective layer 114 and at least one optical film 116. The back bezel 108 is made of an opaque material, such as plastic, metal or any combination material thereof. The light source 110 is disposed on the back bezel 108 for emitting light to the display panel 104. The light source 110 may be cold cathode fluorescent lamps (CCFL), light emitting diodes (LED), an organic light emitting diode (OLED), an electro-luminescence (EL) device, a light bar or any combination thereof. The holders 112 are disposed oppositely at a first side and a second side of the backlight module 106 and assembled at two opposite sides of the back bezel 108. The holders 112 may be configured to hold the light source 110 on the back bezel 108 and simultaneously supporting the display panel 104 on the backlight module 106.

Referring to FIG. 3 again, the reflective layer 114 of the present embodiment is formed on the back bezel 108. The reflective layer 114 may be for example a reflective film or a reflective coated layer with a light reflective material for reflecting light from the light source 110. The light reflective material may be for example Ag, Al, Au, Cr, Cu, In, Ir, Ni, Pt, Re, Rh, Sn, Ta, W, Mn, any alloy combination thereof, white reflective paint with etiolation-resistant and heat-resistant properties or any combination thereof, for reflecting light.

Referring to FIG. 2 again, the optical film 116 of the present embodiment may be for example a diffuser, a prism sheet, a turning prism sheet, a brightness enhancement film, a dual brightness enhancement film, a diffused reflective polarizer film or any combination thereof, and is disposed above the light source 110 for optical improvement.

Referring to FIG. 3 again, in the present embodiment, the backlight module 106 may be a bottom-lighting type. At this time, the backlight module 106 may further comprise a plurality of lamp holders 118 and a plurality of lamp supporters 120 for supporting the light source 110 (such as lamps) on the back bezel 108. The lamp holders 118 may be respectively disposed at two sides of the light source 110 for holding it and protecting the electrical connection thereof. The lamp holders 118 are preferably made of a rubber material (such as silica gel) to provide a buffer effect for protecting the light source 110. The lamp supporters 120 are disposed between the lamp holders 118 for further supporting the light source 110. In the present embodiment, the at least one light source 110 may be for example a plurality of cold cathode fluorescent lamps. At this time, the lamp supporters 120 can provide the long and thin CCFLs with an effective support, thereby preventing the light source 110 from breaking in assembling, transportation or using.

Figure 4:
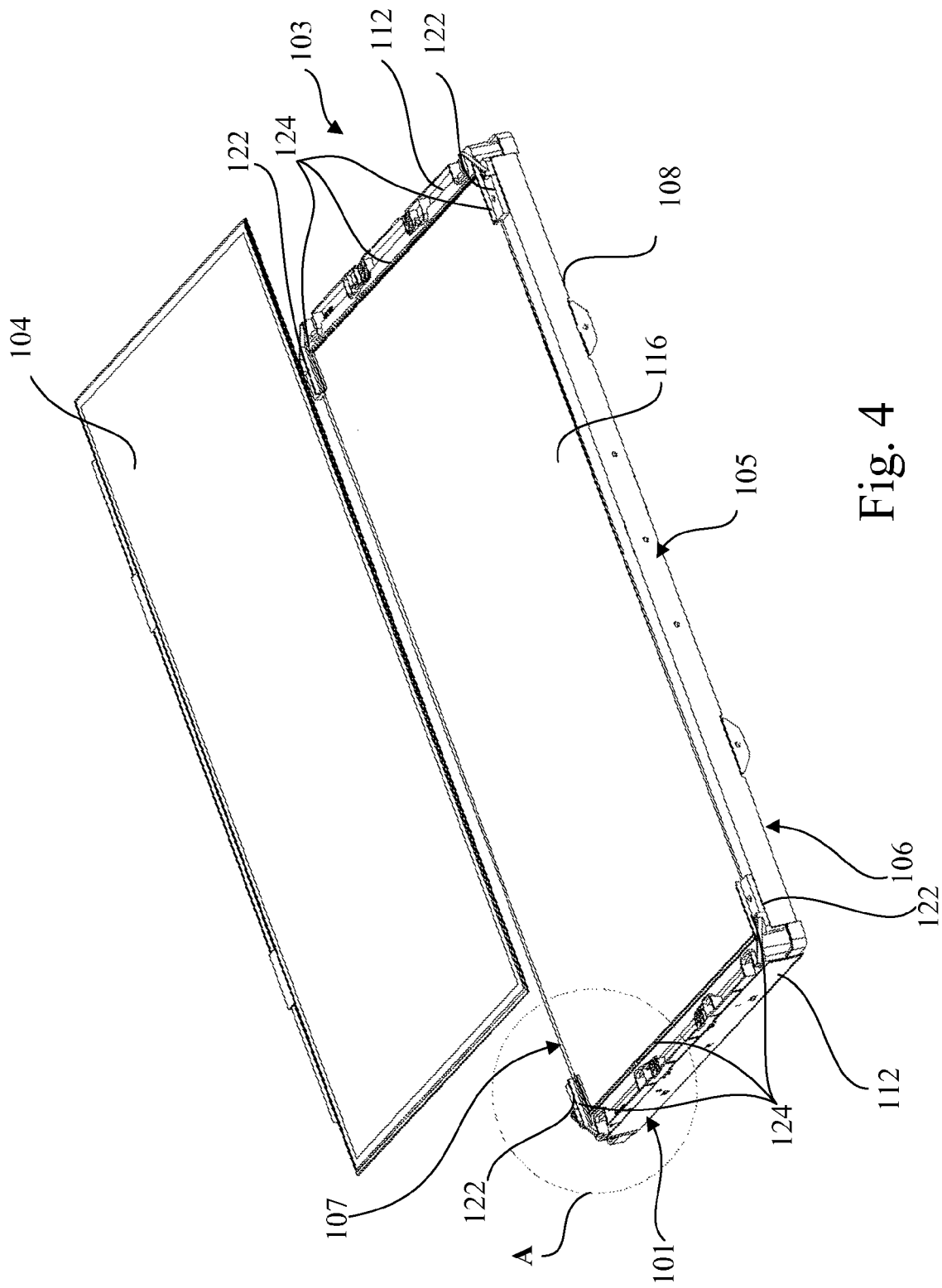
FIG. 4 is a perspective view showing a display panel and a backlight module according to a first embodiment of the present invention.
Figure 5:
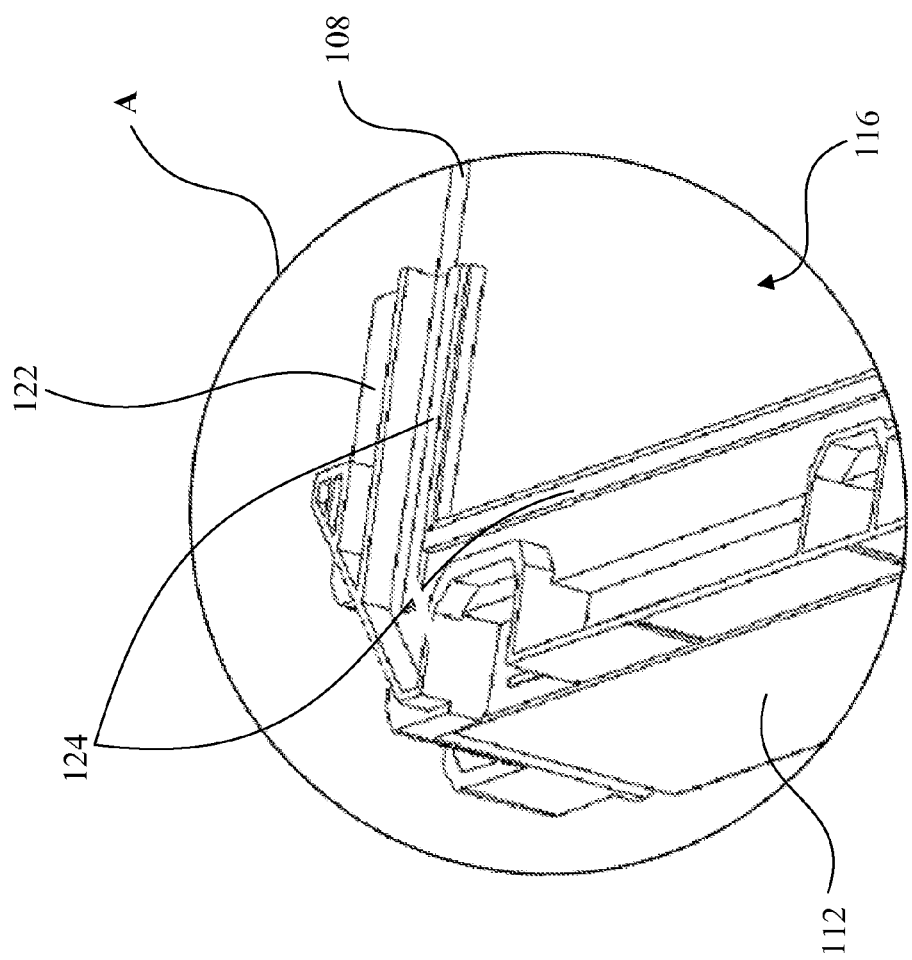
FIG. 5 is an enlarged view of a region A showing in FIG. 4.

Referring to FIG. 2, FIG. 4 and FIG. 5, FIG. 4 is a perspective view showing a display panel and a backlight module according to a first embodiment of the present invention, and FIG. 5 is an enlarged view of a region A showing in FIG. 4. The holders 112 of the present embodiment may be respectively disposed at a first side 101 and a second side 103 of the backlight module 106. The holders 112 are assembled at two opposite sides of the back bezel 108 for securely holding the light source 110 (such as lamps) on the back bezel 108, wherein the first side 101 is opposite and parallel to the second side 103. Each of the holders 112 comprises two extension holding portions 122 and a panel supporting surface 124. The extension holding portions 122 are respectively formed at two ends of each of the holders 112. The extension holding portions 122 partially and oppositely extend from the holders 112 to a third side 105 and a fourth side 107 of the backlight module 106, wherein the third side 105 is opposite and parallel to the fourth side 107. The extension holding portions 122 are preferably formed on the holders 112 as one piece. The third side 105 and the fourth side 107 of the backlight module 106 are perpendicular to the first side 101 and the second side 103 thereof, i.e. the main bodies of the holders 112 are respectively disposed at the first side 101 and the second side 103 thereof, and the extension holding portions 122 perpendicularly and partially extend from main bodies of the holders 112 to the third side 105 and the fourth side 107 thereof. Furthermore, the extension holding portions 122 of the holders 112 are assembled with the edges of the back bezel 108 for supporting the display panel 104.

Referring to FIG. 3 again, in the present embodiment, four extension holding portions 122 of the holders 112 may be formed at four corners of the back bezel 108 (on the third side 105 and the fourth side 107 of the backlight module 106) for carrying and positioning the display panel 104 on the backlight module 106. The panel supporting surface 124 is formed on the main body of the holders 112 and the extension holding portions 122 for supporting the display panel 104, i.e. the panel supporting surface 124 can be formed at the first side 101, the second side 103, the third side 105 and the fourth side 107 of the backlight module 106. Therefore, when the display panel 104 is supported on the backlight module 106, the weight of the display panel 104 can be supported by the four sides of the backlight module 106, thereby securely carrying and positioning the display panel 104 on the backlight module 106. Furthermore, since the extension holding portions 122 are only partially disposed at the third side 105 and the fourth side 107 of the backlight module 106, but not cross the third side 105 and the fourth side 107 thereof entirely, the material of the holders 112 can be reduced, thereby reducing the weight of the backlight module 106.

When assembling the display apparatus 100 of the present embodiment, firstly, the holders 112 are assembled at the two opposite sides of the back bezel 108 (the first side 101 and the second side 103) to form the backlight module 106. Subsequently, the display panel 104 is disposed on the backlight module 106. At this time, the display panel 104 can be supported and positioned by the holders 112 of the backlight module 106, wherein the panel supporting surface 124 thereof can be formed on the four sides of the backlight module 106 for securely supporting and positioning the display panel 104.

Therefore, the holders 112 of the present embodiment can form the panel supporting surface 124 on the four sides of the backlight module 106 for securely supporting and positioning the display panel 104 thereon. Since the backlight module 106 can only use two holders 112 to carry and position the display panel 104, the number of the components and the weight of the display apparatus 100 can be reduced, and the assembling time and the position error can be also reduced.

Figure 6:
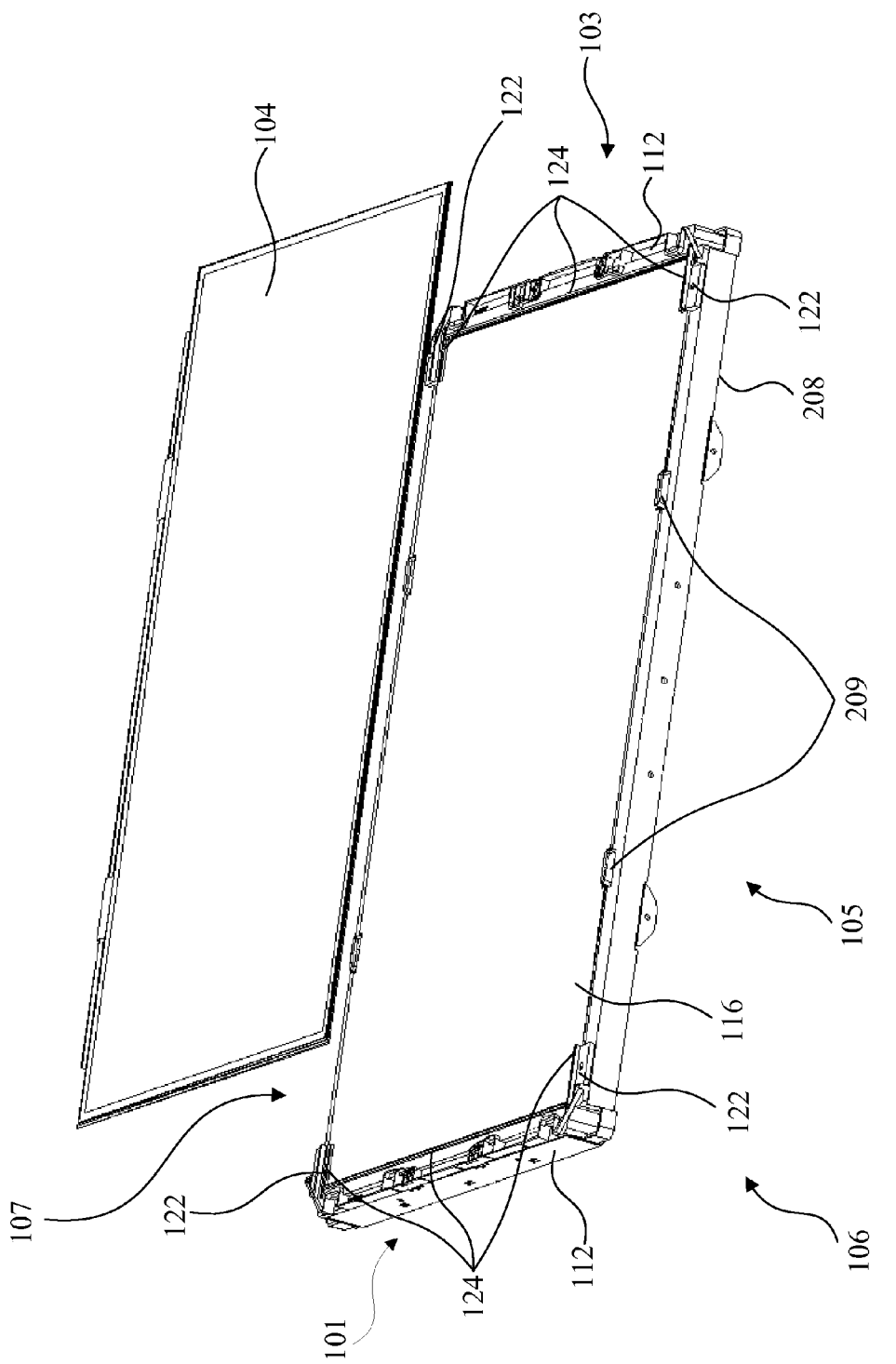
FIG. 6 is a perspective view showing a display panel and a backlight module according to a second embodiment of the present invention.

Referring to FIG. 6, a perspective view showing a display panel and a backlight module according to a second embodiment of the present invention is illustrated. Only the difference between the embodiment and the first embodiment will be described hereinafter, and thus the similar portions therebetween will be not stated in detail herein. In comparison with the first embodiment, the back bezel 208 of the second embodiment may include at least one convex portion 209 disposed at two sides thereof and position at the third side 105 or the fourth side 107 of the backlight module 106 and between the opposite extension holding portions 122 of the two holders 112. The convex portion 209 can be in the form of any shape, such as a rectangular convex portion with a flat surface (top surface). The height of the flat surface of the convex portion 209 is substantially the same as the height of the panel supporting surface 124 and thus can act as the panel supporting surface 124 to support and position the display panel 104 on the backlight module 106. Furthermore, the convex portion 209 of the back bezel 208 can also share the weight of the display panel 104 for improving the deformation problem due to the weight thereof. In the present embodiment, the back bezel 208 may for example have four convex portions 209 positioned on the back bezel 208 and between the opposite extension holding portions 122 of the two holders 112, and two convex portions 209 are disposed at the third side 105, and the other two convex portions 209 are disposed at the fourth side 107, thereby more securely supporting and positioning the display panel 104 on the backlight module 106.

As described above, the backlight module, the holder structure thereof and the display apparatus using the same of the present invention can reduce the number of the components, thereby reducing the weight thereof, the assembling time and the position error. Furthermore, since the present invention can only use two holders to hold the components of the backlight module and to simultaneously contact with four sides of the display panel for supporting and positioning the display panel, the present invention can reduce the material used by the components, thereby reducing the cost thereof. Since the holders of the backlight module of the present invention have few components and assembly steps are relatively easy, the assembling time and the position error of the display apparatus can be significantly reduced.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A display apparatus, wherein the display apparatus comprises:
    a backlight module comprising:
        a back bezel;
        at least one light source disposed on the back bezel; and
        two holders disposed oppositely at a first side and a second side of the backlight module and assembled at two opposite sides of the back bezel, and each of the two holders is U-shaped, and the two holders are distanced from each other, wherein each of the holders comprises:
            two extension holding portions formed at two ends of each of the holders and partially and oppositely extending from the holders to a third side and a fourth side of the backlight module; and
            a panel supporting surface formed on the holders and the extension holding portions; and
    a display panel supported on the panel supporting surface of the holders;
    wherein the back bezel includes at least one convex portion, and the convex portion is positioned between the opposite extension holding portions of the two holders, and the at least one convex portion has at least one flat surface to support the display panel, and the height of the flat surface is the same as the height of the panel supporting surface.

2. The display apparatus according to claim 1, wherein the extension holding portions are formed on the holders as one piece.

3. A backlight module, wherein the backlight module comprises:
    a back bezel;
    at least one light source disposed on the back bezel; and
    two holders disposed oppositely at a first side and a second side of the backlight module and assembled at two opposite sides of the back bezel, and each of the two holders is U-shaped, and the two holders are distanced from each other, wherein each of the holders comprises:
        two extension holding portions formed at two ends of each of the holders and partially and oppositely extending from the holders to a third side and a fourth side of the backlight module; and
        a panel supporting surface formed on the holders and the extension holding portions for supporting a display panel;
    wherein the back bezel includes at least one convex portion, and the convex portion is positioned between the opposite extension holding portions of the two holders, and the at least one convex portion has at least one flat surface to support the display panel, and the height of the flat surface is the same as the height of the panel supporting surface.

4. The backlight module according to claim 3, wherein the extension holding portions are formed on the holders as one piece.

5. The backlight module according to claim 3, wherein the extension holding portions are assembled with the edges of the back bezel.

* * * * *